OUTPUT OF AMPLITUDE DETECTOR

OUTPUT OF BOXCAR CIRCUIT

United States Patent Office 2,934,757
Patented Apr. 26, 1960

2,934,757

MONOPULSE RADAR SYSTEM

William G. Hoefer, Syracuse, and Donald H. Kuhn, North Syracuse, N.Y., assignors to the United States of America as represented by the Secretary of the Army Application November 18, 1958, Serial No. 774,792

8 Claims. (Cl. 343—16)

This invention relates to radar tracking systems and more particularly to monopulse type radar systems.

In the various types of monopulse systems, gain and phase differences between the sum signal and difference signal receiver channels have a harmful effect upon the operation of the system. The sum signal, $\Sigma$, is the summation of the signal from the full antenna aperture and is used for radar range measurements and as a signal reference. In the combination amplitude-phase comparison system the difference signal, $\Delta$, is made up of vertical and horizontal error components. The resultant error signal is amplified in the $\Delta$ IF amplifier and the vertical and horizontal components separated out in phase detector circuits. The azimuth error voltage component results from the phase difference $\phi$ of the $\Sigma$ and $\Delta$ signal and is in time quadrature with the sum signal. The elevation error signal results from the difference in magnitude of the target signals off the boresight axis and is in time phase with the sum signal. In the phase-comparison system and in the amplitude-comparison system, phase shift between channels can cause a shift of the boresight due to the fact that the hybrid comparison circuit never has a complete null on the boresight. In addition, the accuracy of the error signals, usually designated as error correction signals and abbreviated ECS, is affected by phase and gain differences in the sum and delta receiving channels. In the combination amplitude-phase comparison system, the boresight axis is not affected, but the accuracy of error signal is seriously affected by both phase and gain differences in the receiver channels. Although the advantages of stabilizing gain and phase shift in the two separate channels are well known, the requirements for such stability are difficult to satisfy. Heretofore, such difficulties were met by designing the system components so as to keep the gain and phase differences to a minimum, and to provide adjustments which must be checked frequently. Another alternative is to provide a monitoring system which continuously measures and corrects the gain and phase differences between channels. Both of these methods, however, add a great deal of complexity to the system.

It is an object of the present invention to provide an improved monopulse radar system wherein the aforementioned difficulties are overcome.

It is another object of the present invention to provide an improved monopulse radar system wherein the effects of gain and phase difference between respective IF systems in the receiver channels is greatly minimized.

In the description below the term "phasor" refers to complex quantities as defined on page 11 of "General Network Analysis" by Lepage and Seely, published by McGraw-Hill Company (1952).

In accordance with the present invention there is provided an amplitude-phase comparison monopulse radar system having means responsive to detected target signal pulses whereby there is produced a first phasor sum signal and a first phasor difference signal having a prescribed phase angle with respect to the first sum signal which difference signal is a measure of the deviation of the target from the boresight axis of the system. Included are means responsive to the first difference signal for changing the frequency thereof with respect to the first sum signal by an amount equal to a prescribed audio frequency and means for generating a reference signal at the prescribed audio frequency. Further included are means for combining the first difference signal at the changed frequency with the first sum signal to produce a second sum signal and a second difference signal such that the second sum and second difference signals are each comprised of an amplitude modulated component and a phase modulated component of a prescribed IF frequency. Both modulated components have a modulation frequency which corresponds to the audio reference frequency and includes the phase angle, the amplitude and phase modulated components of the second sum signal being equal but out of phase, respectively, with the amplitude modulated and phase modulated components of the second difference signal. In addition, there is included discrete amplifiers for amplifying the second sum and difference signals and having discrete gains, and discrete means for detecting the respective amplitude modulated components of the amplified second sum and difference signals. Also included are means responsive to the sum of the detected amplitude modulation components and in circuit with each of the amplifiers whereby the sum of the discrete gains of the amplifiers is maintained constant. Further included are means responsive to the difference of the detected amplified amplitude modulated components for recovering the envelope of the amplitude modulation component common to both the second sum and difference signal whereby there is produced a first audio signal at said reference audio frequency but shifted in phase by the phase angle, and means responsive to the combined amplified phase modulated components common to both the second sum and second difference signals whereby there is produced a second audio signal at the reference audio frequency but shifted in phase by the phase angle. Included further are means for adding the first and second audio signals, and means for comparing the reference audio signal with the output of the adding means whereby the components of said audio frequency signal which are in-phase and in-quadrature-phase with said reference audio frequency signal are separately detected.

For a better understanding of the present invention, together with other and further objects thereof, reference is had to the following description taken in connection with the accompanying drawing in which.

Figure 1:
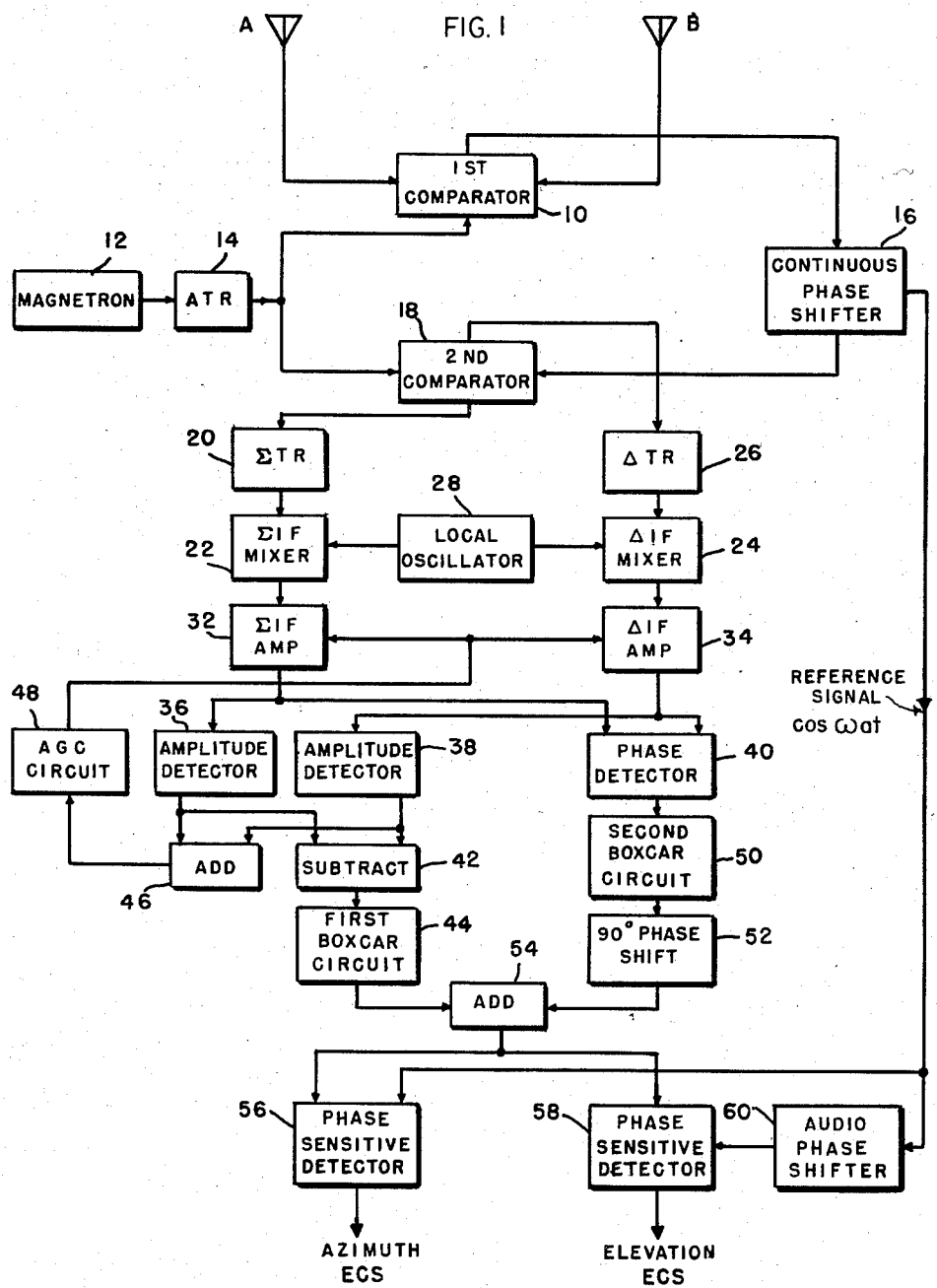
Fig. 1 is a block schematic diagram of the monopulse system.

Referring now to Fig. 1 of the drawing, A and B schematically represent the two antennas of a combination amplitude-phase comparison monopulse radar system. Physically, the antennas are placed side by side in a horizontal plane, but tilted, one up one down, in the vertical plane. A complete description of the antenna arrangement in the combination amplitude-phase comparison monopulse radar system is disclosed in the copending application of George M. Kirkpatrick for "Improved Monopulse Radar System," Serial No. 677,181. The antennas A and B are each coupled to a first balanced duplexer or waveguide hybrid comparator circuit 10. Such balanced duplexers are well known in the art and are fully described in U.S. Patent 2,445,895, dated July 27, 1948. First comparator circuit 10 permits power fed from a pulsed transmitter magnetron 12 through a conventional ATR circuit 14 at a prescribed PRF, $f_r$, to be radiated in the same phase from antennas A and B, but the received echo pulse detected by each of the antennas is combined in the first comparator circuit 10 to produce discrete sum and difference signals designated by the symbols Σ and Δ, respectively. If the respective signals at the antennas for a received target echo are assumed to be $E_A$ and $E_B$, then the output from first comparator circuit 10 will provide a first sum signal $$\Sigma = \frac{(E_A + E_B)}{\sqrt{2}}$$

and a first difference signal $$\Delta = \frac{(E_A - E_B)}{\sqrt{2}}$$

As phasor quantities, the first sum and difference signals may be designated as $\Sigma$ and $\Delta e^{j\phi}$, where $\phi$ is the phase shift of the difference channel with respect to the sum channel. Since the frequency of the sum and difference signals at the output of first comparator 10 is the same as that of the transmitted frequency, hereinafter referred to as $\omega_1$, the respective first sum and difference signals may be respectively designated as $\Sigma \cos \omega_1 t$ and $\Delta \cos (\omega_1 t + \phi)$. The first difference signal $\Delta \cos (\omega_1 t + \phi)$ is passed through a continuous rotary phase shifter 16 to provide a continuous frequency which differs from $\omega_1$ by a frequency $\omega_a$ which is an audio frequency less than one-half the PRF frequency $f_r$ at which the magnetron transmitter 12 is pulsed. One such phase shifter well known in the art is described in volume 8 of the MIT Radiation Series (1948), "Principles of Microwave Circuits," pages 355–358. It consists of a length of round waveguide having a rotatable section such that a signal propagating through the waveguide experiences a phase shift linearly proportional to the angular position of the rotating section. The rotatable section is continuously and linearly driven by any suitable means at a rate which will produce a linear phase shift of $\omega_a$, or $2\pi f_a$ radians per second. This mechanical rotation produces a linear phase shift at the audio frequency rate so that with the input $\Delta \cos (\omega_1 t + \phi)$ applied to the phase shifter 16 as the incident wave, the output signal therefrom will be $\Delta \cos [(\omega_1 + \omega_a)t + \phi]$. The mechanical rotation of the shaft which drives the rotary section of the phase shifter at the audio rate is converted to an audio frequency signal $\cos \omega_a t$ by any suitable means well known in the art. As hereinbelow described, the audio signal $\cos \omega_a t$ will provide the reference signal for the system. It is to be understood, of course, that any other suitable phase shifter, a ferrite type for example, may be used to produce the difference signal $\Delta \cos [(\omega_1 + \omega_a)t + \phi]$.

The output of continuous phase shifter 16 is combined in a second comparator circuit 18 with first sum signal $\Sigma \cos \omega_1 t$ to produce second sum and difference phasor signals $\Sigma + \Delta e^{j(\omega_a t + \phi)}$ and $\Sigma - \Delta e^{j(\omega_a t + \phi)}$, respectively. The audio frequency $\omega_a$ is chosen such that the frequencies of the first sum and difference signals are a few hundred cycles apart. The two outputs from second comparator circuit 18 are applied as respective inputs to two channels A and B, each of which include a TR circuit, an IF mixer and an IF amplifier. As shown, the second sum signal $\Sigma + \Delta e^{j(\omega_a t + \phi)}$ is applied through TR circuit 20 to A channel IF mixer circuit 22 and the second difference signal $\Sigma - \Delta e^{j(\omega_a t + \phi)}$ is applied to B channel IF mixer circuit 24 through TR circuit 26, both signals being heterodyned in their respective mixers by the output from a common local oscillator 28 to produce respective A channel IF and B channel IF signals at a prescribed IF frequency $\omega_3$. The output signal derived from A channel IF mixer 22 can be represented as $$\Sigma \cos \omega_3 t + \Delta \cos [(\omega_3 + \omega_a)t + \phi]$$

and the output signal derived from B channel IF mixer 24 can be represented as $$\Sigma \cos \omega_3 t - \Delta \cos [(\omega_3 + \omega_a)t + \phi]$$

Figure 3:
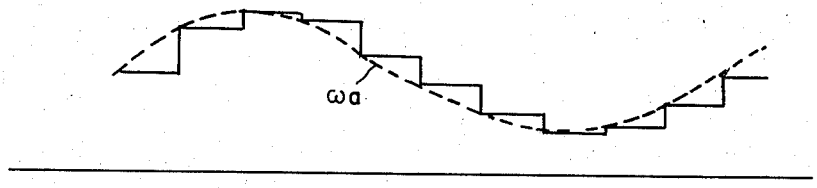

As explained hereinbelow, the A and B channel IF signals each include an amplitude modulated component and a phase modulated component, both having the audio modulation frequency $\omega_a$. The signal outputs from A channel IF mixer 22 and B channel IF mixer 24 are applied through respective IF amplifiers 32 and 34 to respective amplitude detectors 36 and 38 and also applied as the two inputs to a first phase detector 40. Amplitude detectors 36 and 38 are conventional in design and include means for filtering out the IF frequency $\omega_3$ so that the respective output signals from amplitude detectors 36 and 38 consist of video pulses modulated by the delta signal varying at the audio rate $\omega_a$, but with the modulation in the two detector outputs being out-of-phase. As shown, the outputs of detectors 36 and 38 are combined in a subtractor circuit 42, the output of which is applied to a first box-car generator or demodulator circuit 44. The outputs of detectors 36 and 38 are also combined in a first adder circuit 46, the output of which is applied as a control signal voltage to an AGC circuit 48 adapted to operate only on a D.-C. component and ignore the audio frequency component $\omega_a$. The output of the AGC circuit 48 is applied to both A and B channel IF amplifiers 32 and 34 so that the sum of the gains of the A and B channels will be maintained at a constant value. First phase detector 40 is responsive to the phase modulation component of the outputs derived from A and B channel IF amplifiers 32 and 34 and the output of phase detector 40 is applied to a second box-car generator or demodulator circuit 50. Any phase shift difference between the IF signals in the two channels will result in a D.-C. output at phase detector 40 which is not recovered by the box-car generator 50, but the desired phase modulation will produce an A.-C. output at frequency $\omega_a$ which is recovered by box-car generator 50. Both box-car generators are of similar construction and function in a manner to stretch the video pulses from a target from one pulse repetition period to the next. As is well known, the box-car circuit consists of an electrical circuit that clamps the potential of a storage element, a capacitor for example, to the video pulse amplitude each time a pulse is received. At all times between pulses, the storage element maintains the potential of the preceding pulse and is altered only when a new video pulse is produced whose amplitude differs from that of the previous one. The flat step-like segments of the voltage output from box-car circuit 40 is shown in Fig. 3. This output is, in effect, a reconstruction of the envelope of the modulated pulse and it furnishes a large audio amplification plus a type of filter action that completely suppresses the PRF and all its harmonics. Thus, the stretching action of the box-car circuits acts to amplify the audio frequency $\omega_a$ and reduce the undesired harmonics. The audio frequency output of second box-car circuit 50 is applied through a quadrature phase-shifting circuit 52 to second adder circuit 54 where it is combined with the output of first box-car circuit 44. The output of adder circuit 54 is applied as one input to a second and third phase sensitive detectors 56 and 58 where it is compared with the audio signal $\cos \omega_a t$ derived from phase shifter 16. As shown, the audio signal is applied to phase detector 58 through audio phase shifter 60 to introduce a 90° phase-shift with respect to the audio reference signal applied to phase detector 56. In this manner, the output of phase detector 56 will provide the azimuth ECS and the output of the phase detector 58 will provide the elevation ECS.

Although the monopulse system shown in Fig. 1 is a pulsed system, for purpose of clarity in explaining the operation of the system it will be considered as a C.W. radar. The principle of operation is the same in both cases, but in this way the necessity for more complex expressions is eliminated. If the A channel IF output from mixer 22 and the B channel IF output from mixer 26 are considered to be C.W. signals then the respective inputs to the A and B channel IF amplifiers 32 and 34 may be expressed as $$\Sigma \cos \omega_3 t - \Delta \cos [(\omega_3+\omega_a)t+\phi]$$
$$= \text{A channel IF signal} \quad (1)$$
$$\Sigma \cos \omega_3 t - \Delta \cos [(\omega_3+\omega_a)t+\phi]$$
$$-[\Delta \sin (\omega_a t+\phi] \sin \omega_3 t \quad (3)$$

If the sum and difference signals of Equations 1 and 2 were observed on an oscilloscope, the two components would appear to "beat" to-gether at the audio rate $\omega_a$. This "beat" is sampled by the PRF $f_r$ since the actual signals from the IF mixers are pulses, and it contains the desired error angle information which is recovered by the action of the non-linear detectors. Mathematically the presence of the "beat" can be shown in connection with Equations 1 and 2. By utilizing well known trigonometric relationships, Equation 1 can be expressed as $$\text{A channel IF} = \Sigma[+\Delta \cos (\omega_a t+\phi] \cos \omega_3 t$$
$$-[\Delta \sin (\omega_a t+\phi] \sin \omega_3 t \quad (3)$$

and Equation 2 can be expressed as $$\text{B channel IF} = [\Sigma-\Delta \cos (\omega_a t+\phi)] \cos \omega_3 t$$
$$+[\Delta \sin (\omega_a t+\phi)] \sin \omega_3 t \quad (4)$$

Figure 2:
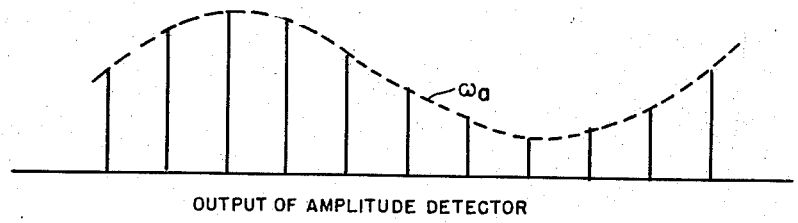
Figs. 2 and 3 are explanatory curves.

The first term of Equations 3 and 4 represent an amplitude component which contains the desired error angle information and the second term represents a phase modulated component having the desired error angle information, both having the audio modulation frequency $\omega_a$. Assuming a total gain of $G_1$ for the signal derived from A channel IF amplifier 32 then the detected amplitude component derived from amplitude detector 36 may be expressed as $$[\Sigma+\Delta \cos (\omega_a t+\phi)]G_1 \quad (5)$$

and this resultant output is shown in Fig. 2. Similarly, assuming a total gain of $G_2$ for the signal derived from B channel IF amplifier 34, then the detected amplitude component derived from the output of amplitude detector 38 may be expressed as $$[\Sigma-\Delta \cos (\omega_a t+\phi)]G_2 \quad (6)$$

The difference of the two signals of Equations 5 and 6 derived from subtract circuit is $$(G_1+G_2)\Delta \cos (\omega_a t+\phi) \quad (7)$$

and first box-car circuit 44 recovers the modulation envelope of the pulses which is given by $$\Delta \cos (\omega_a t+\phi) \quad (8)$$

In a similar manner, the outputs of IF amplifiers 32 and 34 are applied to first phase detector 40 which detects the phase modulation component of the expression shown in Equations 3 and 4. The phase shift difference between the IF signals in the two channels will result in a D.-C. output from the first phase detector 40 which will not be recovered by second box-car circuit 50, whereas the desired phase modulation will give an A.-C. output signal at frequency $\omega_a$ which will be reconstructed by second box-car circuit 50. This output from second box-car circuit 50 will be proportional to $$\Delta \sin (\omega_a t+\phi) \quad (9)$$

Phase detector 40 is also made insensitive to the relative amplitudes of the two IF outputs derived from amplifiers 32 and 34 so that the error signal $\Delta \sin (\omega_a t+\phi)$ derived from second box-car circuit 50 will also be independent of gain and phase differences of the two channels. The error signal $\Delta \sin (\omega_a t+\phi)$ is passed through 90° phase shifter 52 to produce the error signal $\Delta \cos (\omega_a t+\phi)$ which is combined with the output error signal $\Delta \cos (\omega_a t+\phi)$ from first box-car circuit 44 in second adder circuit 54 to produce the error signal $$2\Delta (\cos \omega_a t+\phi) \quad (10)$$

The error signal of Equation 10 is applied respectively as an input to second and third phase detectors 56 and 58 to which are also applied respectively reference signals $\cos \omega_a t$ and $\sin \omega_a t$. Thus the output of phase sensitive detector 56 will produce the azimuth ECS while phase sensitive detector 58 will produce the elevation ECS. The audio reference frequency chosen may be 400 cycles so that it could readily be used for an A.C. servo system adapted to operate at an error frequency of 400 cycles.

The sum of the two detected signals of Equations 5 and 6 are derived from adder circuit 46 and may be expressed as $$\Sigma(G_1+G_2)+(G_1-G_2)\Delta \cos (\omega_a t+\phi) \quad (11)$$

As hereinabove described, the AGC circuit 48 is arranged such that it operates on the D.-C. component of Equation 11, that is $\Sigma(G_1+G_2)$, and ignores the component at audio reference frequency $\omega_a$. With the AGC signal output being applied as gain control voltage to both the A channel IF amplifier 32 and the B channel IF amplifier 34, the AGC output operates in a fashion to maintain $(G_1+G_2)$ equal to a constant value. Since the error signal is also proportional to $(G_1+G_2)$ it is seen that any gain difference between the A and B channels does not affect the error signal.

It has been found that by recovering the phase modulation and amplitude modulation components and combining them as hereinabove described, a better signal-to-noise ratio performance could be obtained than with using the amplitude modulation component alone. The further advantages resulting from this type of operation results in eliminating the effects of gain and phase difference in the RF part of the system as well as the IF part of the system, and the error signals are A.-C. signals and are not subject to D.-C. drifts. Although the monopulse system described above is that of the combination phase-amplitude comparison system, it is to be understood that the same may be used with single coordinate amplitude comparison systems or phase comparison systems. Also, it could readily apply to two coordinate phase or amplitude comparison systems by merely making simple modifications.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a combination amplitude-phase comparison monopulse radar system having means for detecting target signal pulses whereby there is produced a first phasor sum signal and a first phasor difference signal having a prescribed phase angle with respect to said first sum signal which difference signal is a measure of the deviation of the target from the boresight axis of the system, means responsive to said first difference signal for changing the frequency thereof with respect to said first sum signal by an amount equal to a prescribed audio frequency, means for generating a reference signal at said audio frequency, means for combining said first difference signal at said changed frequency with said first sum signal to produce a second sum signal and a second difference signal such that the second sum and second difference signals each comprise an amplitude modulated component and a phase modulated component of a prescribed IF frequency, both of said modulated components having a modulation frequency corresponding to said reference audio frequency and including said phase angle, the amplitude and phase modulated components of said second sum signal being equal but out-of-phase respectively with the amplitude modulated and phase modulated components of said second difference signal, discrete amplifiers for amplifying said second sum and second difference signals, discrete means for detecting the respective amplitude modulated components of said amplified second sum and difference signals, means responsive to the difference of the detected amplitude modulated components for recovering the envelope of the amplitude modulation component common to both said second sum and second difference signals whereby there is produced a first audio signal at said reference audio frequency but shifted in phase by said phase angle, means responsive to the combined amplified phase modulated components common to both said second sum and second difference signals whereby there is produced a second audio signal at said reference audio frequency but shifted in phase by said phase angle, means for adding said first and second audio signals, and means for comparing said reference audio frequency signal with the output of said adding means whereby the components of said audio frequency signal which are in-phase and in-quadrature-phase with said reference audio frequency signal are separately detected.

2. The system in accordance with claim 1 wherein the means for changing the frequency of the first difference signal comprises a rotary type phase shifter having its rotary member continuously rotated at a rate corresponding to the reference audio frequency.

3. In a combination amplitude-phase comparison monopulse radar system having means for detecting target signal pulses whereby there is produced a first phasor sum signal and a first phasor difference signal having a prescribed phase angle with respect to said first sum signal which difference signal is a measure of the deviation of the target from the boresight axis of the system, means responsive to said first difference signal for changing the frequency thereof with respect to said first sum signal by an amount equal to a prescribed audio frequency, means for generating a reference signal at said audio frequency, means for combining said first difference signal at said changed frequency with said first sum signal to produce a second sum signal and a second difference signal such that the second sum and second difference signals each comprise an amplitude modulated component and a phase modulated component of a prescribed IF frequency, both of said modulated components having a modulation frequency corresponding to said reference audio frequency and including said phase angle, the amplitude and phase modulated components of said second sum signal being equal but out-of-phase respectively with the amplitude modulated and phase modulated components of said second difference signal, discrete amplifiers for amplifying said second sum and second difference signals and having discrete gains, discrete means for detecting the respective amplitude modulated components of said amplified second sum and difference signals, means responsive to the difference of the detected amplified amplitude modulated components for recovering the envelope of the amplitude modulation component common to both said second sum and second difference signals whereby there is produced a first audio signal at said reference audio frequency but shifted in phase by said phase angle, means responsive to the sum of the detected amplitude modulation components and in circuit with each of said amplifiers whereby the sum of the gains of said amplifiers is maintained constant, means responsive to the combined amplified phase modulated components common to both said second sum and second difference signals whereby there is produced a second audio signal at said reference frequency but shifted in phase by said phase angle, means for adding said first and second audio signals, and means for comparing said reference audio frequency signal with the output of said adding means whereby the components of said audio frequency signal which are in-phase and in-quadrature-phase with said reference audio frequency signal are separately detected.

4. In a combination amplitude-phase comparison monopulse radar system having means for detecting target signal pulses whereby there is produced a first phasor sum signal and a first phasor difference signal having a prescribed phase angle with respect to said first sum signal which difference signal is a measure of the deviation of the target from the boresight axis of the system, means responsive to said first difference signal for changing the frequency thereof with respect to said first sum signal by an amount equal to a prescribed audio frequency, means for generating a reference signal at said audio frequency, means for combining said first difference signal at said changed frequency with said first sum signal to produce a second sum signal and a second difference signal such that the second sum and second difference signals each comprise an amplitude modulated component and a phase modulated component of a prescribed IF frequency, both of said modulated components having a modulation frequency corresponding to said reference audio frequency and including said phase angle, the amplitude and phase modulated components of said second sum signal being equal but out-of-phase respectively with the amplitude modulated and phase modulated components of said second difference signal, discrete amplifiers for amplifying said second sum and second difference signals, discrete means for detecting the respective amplitude modulated components of said amplified second sum and difference signals, means for subtracting the discrete detected amplitude modulated components, a box-car circuit responsive to the output of said subtracting means for recovering the envelope of the amplitude modulation component common to both said second sum and second difference signals, said recovered envelope being a first audio signal at said reference audio frequency but shifted in phase by said phase angle, means responsive to the combined amplified phase modulated components common to both said second sum and second difference signals whereby there is produced a second audio signal at said reference audio frequency but shifted in phase by said phase angle, means for adding said first and second audio signals, and means for comparing said reference audio frequency signal with the output of said adding means whereby the components of said audio frequency signal which are in-phase and in-quadrature-phase with said reference audio frequency signal are separately detected.

5. In a combination amplitude-phase comparison monopulse radar system having means for detecting target signal pulses whereby there is produced a first phasor sum signal and a first phasor difference signal having a prescribed phase angle with respect to said first sum signal which difference signal is a measure of the deviation of the target from the boresight axis of the system, means responsive to said first difference signal for changing the frequency thereof with respect to said first sum signal by an amount equal to a prescribed audio frequency, means for generating a reference signal at said audio frequency, means for combining said first difference signal at said changed frequency with said first sum signal to produce a second sum signal and a second difference signal such that the second sum and second difference signals each comprise an amplitude modulated component and a phase modulated component of a prescribed IF frequency, both of said modulated components having a modulation frequency corresponding to said reference audio frequency and including said phase angle, the amplitude and phase modulated components of said second sum signal being equal but out-of-phase respectively with the amplitude modulated and phase modulated components of said second difference signal, discrete amplifiers for amplifying said second sum and second difference signals, discrete means for detecting the respective amplitude modulated components of said amplified second sum and difference signals, means responsive to the difference of the detected amplitude modulated components for recovering the envelope of the amplitude modulation component common to both said second sum and second difference signals whereby there is produced a first audio signal at said reference audio frequency but shifted in phase by said phase angle, a phase detector responsive to the combined amplified phase modulated components common to both said second sum and second difference signals whereby there is produced a second audio signal at said reference audio frequency but shifted in phase by said phase angle, and in quadrature relationship to said reference audio signal, a box-car circuit responsive to the output of said phase detector for recovering the envelope of the second audio signal, means for shifting the output of said box-car circuit 90° whereby the envelope of said second audio signal is in phase with the envelope of said first audio signal, means for adding said first audio signal and the output of said 90° phase shifting means, and means for comparing the reference audio frequency signal with the output of said adding means whereby the components of said audio frequency signal which are in-phase and in-quadrature-phase with said reference audio frequency signal are separately detected.

6. In a combination amplitude-phase comparison monopulse radar system having means for detecting target signal pulses whereby there is produced a first phasor sum signal and a first phasor difference signal having a prescribed phase angle with respect to said first sum signal which difference signal is a measure of the deviation of the target from the boresight axis of the system, means responsive to said first difference signal for changing the frequency thereof with respect to said first sum signal by an amount equal to a prescribed audio frequency, means for generating a reference signal at said audio frequency, means for combining said first difference signal at said changed frequency with said first sum signal to produce a second sum signal and a second difference signal such that the second sum and second difference signals each comprise an amplitude modulated component and a phase modulated component of a prescribed IF frequency, both of said modulated components having a modulation frequency corresponding to said reference audio frequency and including said phase angle, the amplitude and phase modulated components of said second sum signal being equal but out-of-phase respectively with the amplitude modulated and phase modulated components of said second difference signal, discrete amplifiers for amplifying said second sum and second difference signals, discrete means for detecting the respective amplitude modulated components of said amplified second sum and difference signals, means for subtracting the discrete detected amplitude modulated components, a first box-car circuit responsive to the output of said subtracting means for recovering the envelope of the amplitude modulation component common to both said second sum and second difference signals, said recovered envelope being a first audio signal at said reference audio frequency but shifted in phase by said phase angle, a phase detector responsive to the combined amplified phase modulated components common to said second sum and second difference signals whereby there is produced a second audio signal at said reference audio frequency but shifted in phase by said phase angle, and in quadrature relationship to said reference audio signal, a second box-car circuit responsive to the output of said phase detector for recovering the envelope of said second audio signal, means for shifting the output of said second box-car circuit 90° whereby the envelope of said second audio signal is in phase with the envelope of said first audio signal, means for adding said first audio output signal and the output of said 90° phase shifting means, and means for comparing the reference audio frequency signal with the output of said adding means whereby the components of said audio frequency signal which are in-phase and in-quadrature-phase with said reference audio frequency signal are separately detected.

7. In a combination amplitude-phase comparison monopulse radar system having means for detecting target signal pulses whereby there is produced a first phasor sum signal and a first phasor difference signal having a prescribed angle with respect to said first sum signal which difference signal is a measure of the deviation of the target from the boresight axis of the system, means responsive to said first difference signal for changing the frequency thereof with respect to said first sum signal by an amount equal to a prescribed audio frequency, means for generating a reference signal at said audio frequency, means for combining said first difference signal at said changed frequency with said first sum signal to produce a second sum signal and a second difference signal such that the second sum and second difference signals each comprise an amplitude modulated component and a phase modulated component of a prescribed IF frequency, both of said modulated components having a modulation frequency corresponding to said reference audio frequency and including said phase angle, the amplitude and phase modulated components of said second sum signal being equal but out-of-phase respectively with the amplitude modulated and phase modulated components of said second difference signal, discrete amplifiers for amplifying said second sum and second difference signals and having discrete gains, discrete means for detecting the respective amplitude modulated components of said amplified second sum and second difference signals, means responsive to the sum of the detected amplitude modulation components and in circuit with each of said amplifiers whereby the sum of the gains of said amplifiers is maintained constant, means for subtracting the discrete detected amplitude modulated components, a first box-car circuit responsive to the output of said subtracting means for recovering the envelope of the amplitude modulation component common to both said second sum and second difference signals, said recovered envelope being a first audio signal at said reference audio frequency but shifted in phase by said phase angle, a phase detector responsive to the combined amplified phase modulated components common to said second sum and second difference signals whereby there is produced a second audio signal at said reference audio frequency but shifted in phase by said phase angle, and in quadrature relationship to said reference audio signal, a second box-car circuit responsive to the output of said phase detector for recovering the envelope of said second audio signal, means for shifting the output of said second box-car circuit 90° whereby the envelope of said second audio signal is in phase with the envelope of said first audio signal, means for adding said first audio output signal and the output of said 90° phase shifting means, and means for comparing the reference audio frequency signal with the output of said adding means whereby the components of said audio frequency signal which are in-phase and in-quadrature-phase with said reference audio frequency signal are separately detected.

8. The system in accordance with claim 7 wherein said last mentioned comparing means comprises a first and second phase sensitive detector, said first detector being responsive to the output of said adding means and said reference audio signal and said second detector being responsive to the output of said adding means and the output of said 90° phase shifting means.

References Cited in the file of this patent

UNITED STATES PATENTS

| | | |
|---|---|---|
| 2,682,656 | Phillips | June 29, 1954 |
| 2,821,701 | Vogeley et al. | Jan. 28, 1958 |

UNITED STATES PATENT OFFICE

Certificate of Correction

Patent No. 2,934,757

April 26, 1960

William G. Hoefer et al.

It is hereby certified that error appears in the printed specification of the above numbered patent requiring correction and that the said Letters Patent should read as corrected below.

Column 5, line 7, the right-hand portion of Equation 2 should appear as shown below instead of as in the patent:

$$= B \text{ channel IF signal} \quad (2)$$

lines 20 and 21, the right-hand portion of Equation 3 should appear as shown below instead of as in the patent:

$$= [\Sigma + \Delta \cos (\omega_a t + \phi)] \cos \omega_3 t$$
$$- [\Delta \sin (\omega_a t + \phi)] \sin \omega_3 t \quad (3)$$

Signed and sealed this 22nd day of November 1960.

[SEAL]

Attest:
KARL H. AXLINE,
*Attesting Officer.*

ROBERT C. WATSON,
*Commissioner of Patents.*